(No Model.) 5 Sheets—Sheet 1.
C. E. ONGLEY.
MOTOR CONTROLLING DEVICE.
No. 561,271. Patented June 2, 1896.
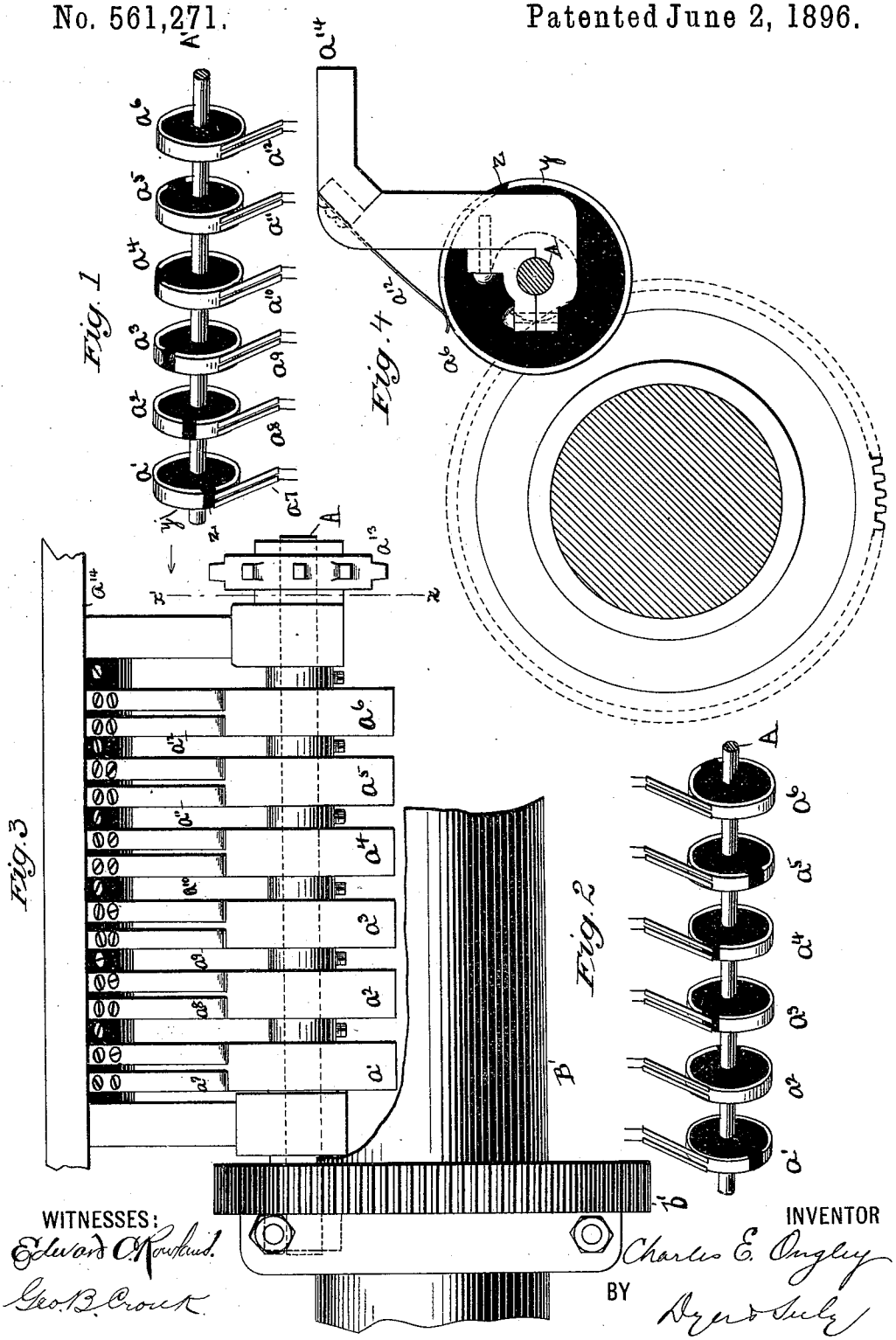
WITNESSES:
Edward C. Rowland
Geo. B. Crouk
INVENTOR
Charles E. Ongley
BY
Dyer & Suly
ATTORNEYS

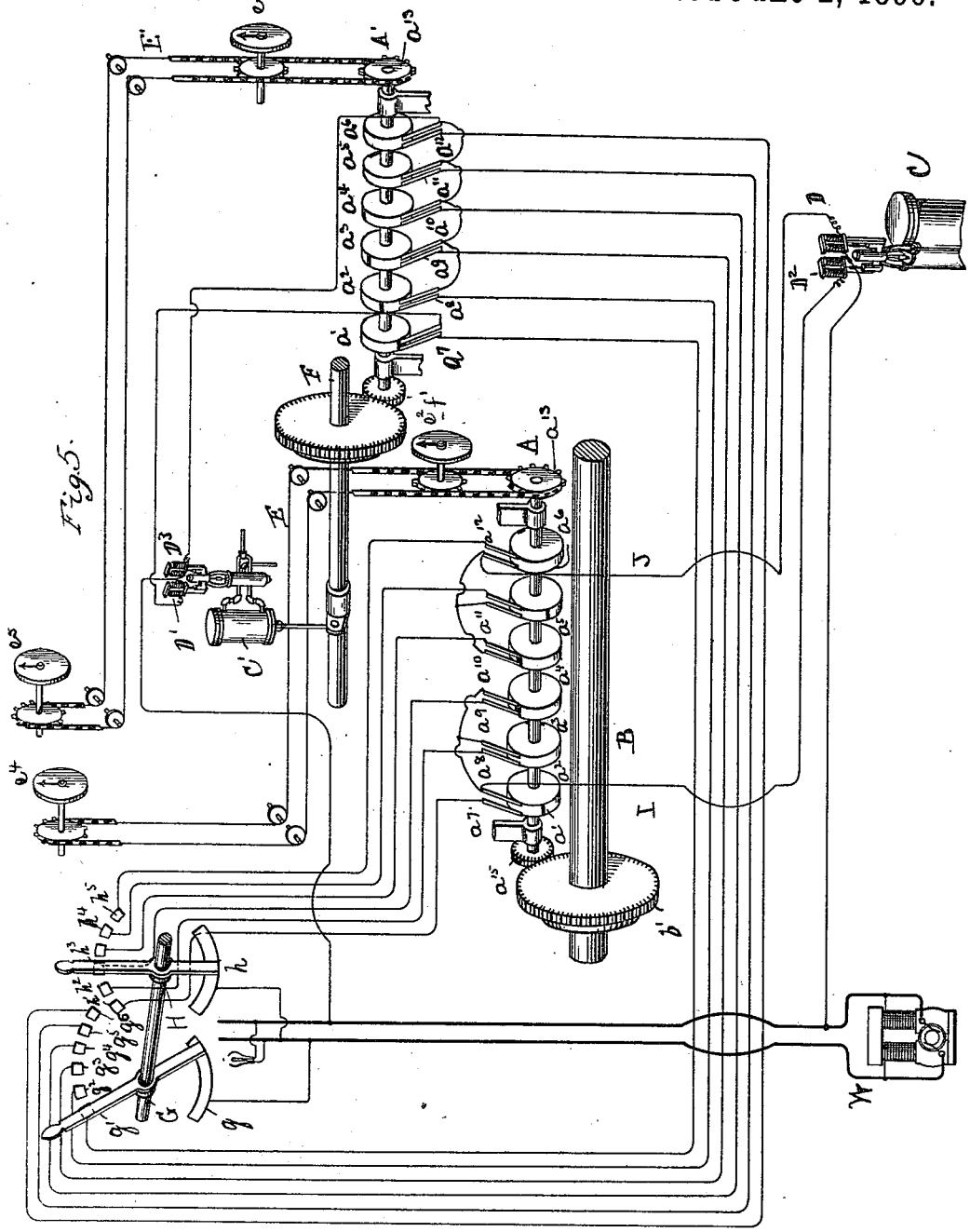

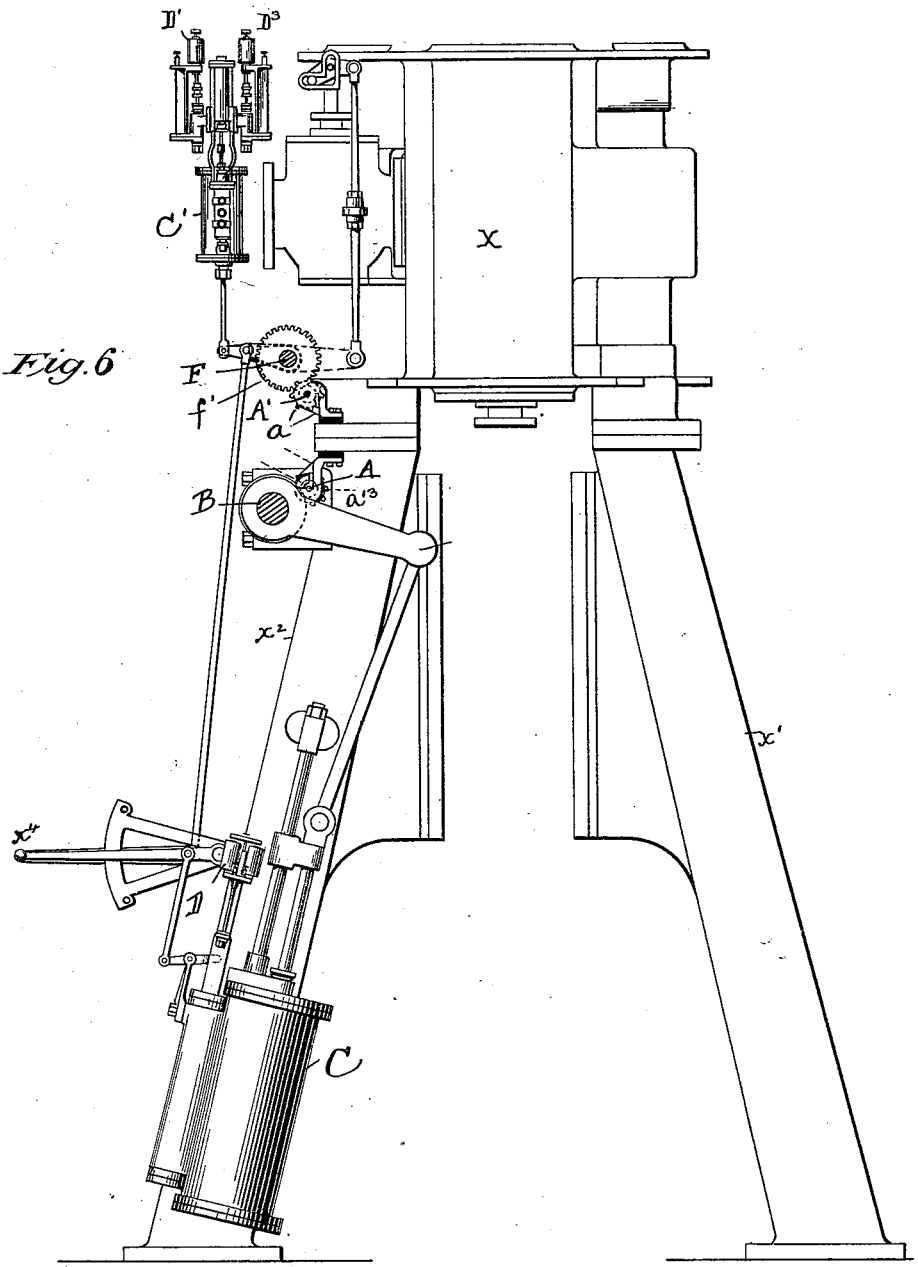

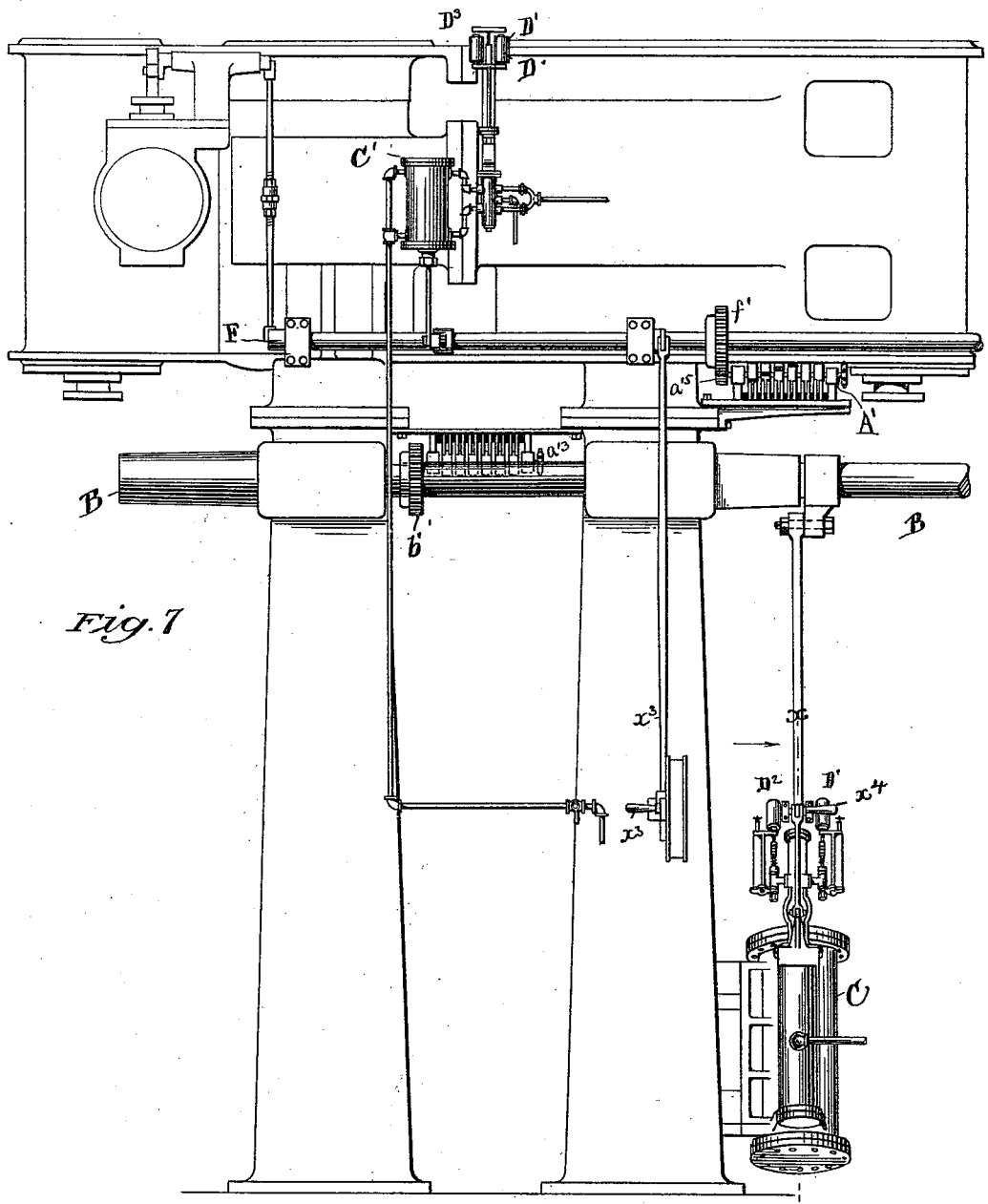

(No Model.) 5 Sheets—Sheet 5.
C. E. ONGLEY.
MOTOR CONTROLLING DEVICE.
No. 561,271. Patented June 2, 1896.
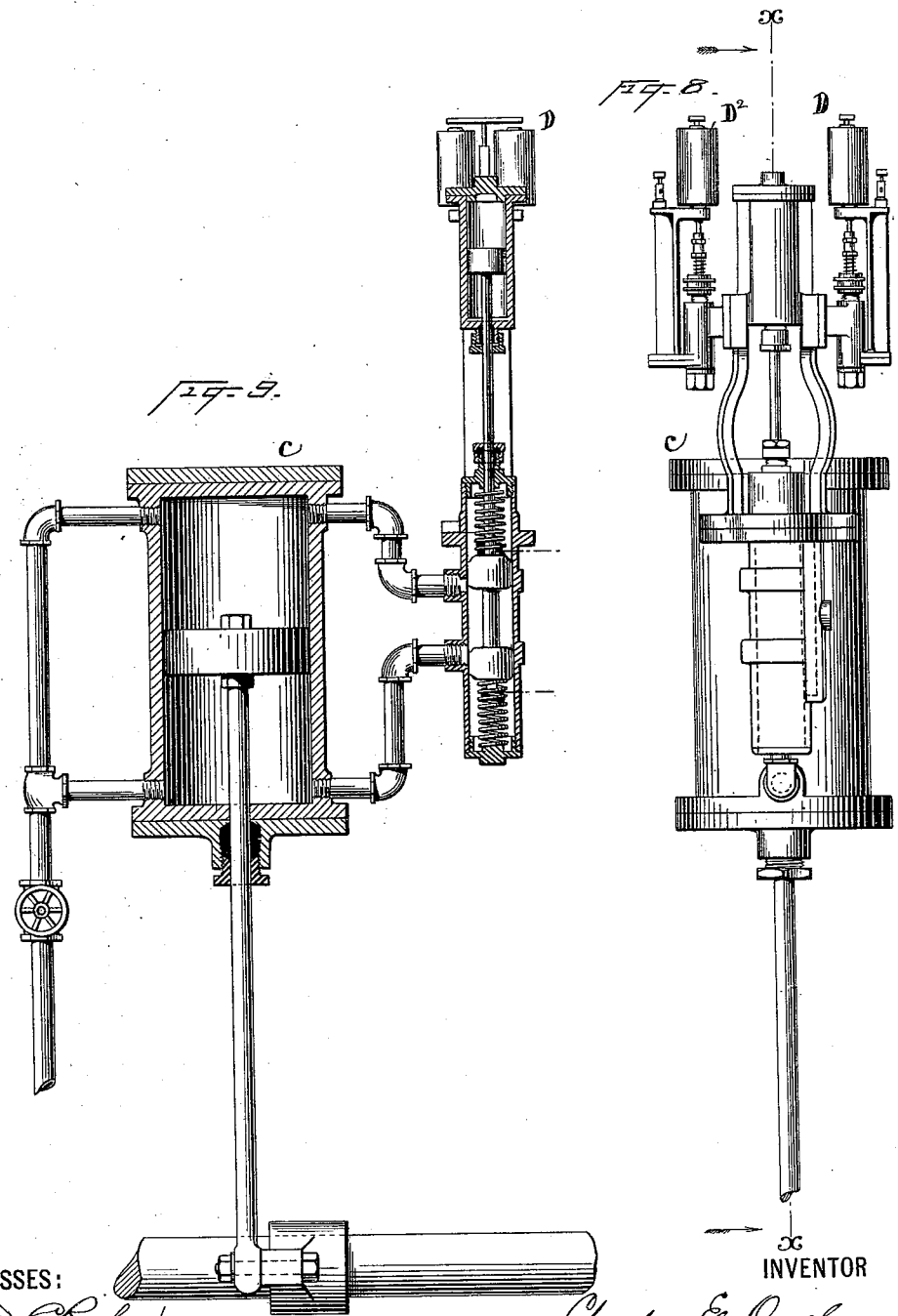
WITNESSES:
Edward C. Rowland
Geo. B. Crouk
INVENTOR
Charles E. Ongley
BY
ATTORNEYs

UNITED STATES PATENT OFFICE.

CHARLES E. ONGLEY, OF NEW YORK, N. Y., ASSIGNOR TO GEORGE J. SCHOEFFEL, OF SAME PLACE.

MOTOR-CONTROLLING DEVICE.

SPECIFICATION forming part of Letters Patent No. 561,271, dated June 2, 1896.

Application filed November 2, 1893. Serial No. 489,861. (No model.)

*To all whom it may concern:*

Be it known that I, CHARLES E. ONGLEY, a citizen of the United States, residing at New York city, in the county and State of New York, have invented a certain new and useful Improvement in Motor-Controlling Devices, of which the following is a specification.

My invention relates to apparatus controlled electrically to regulate the operation of a motor according to a predetermined movement.

I have described and illustrated my invention as the same may be applied to the control of the links or throttle of a steam-engine.

In the drawings like letters refer to like parts.

Figures 1 and 2 are detailed perspective views of the commutators arranged in series. Fig. 3 is an elevation of the series of commutators with part of the shaft broken away. Fig. 4 is a sectional view of the same, taken on the lines $x\,x$. Fig. 5 is a diagrammatic perspective view of the elements comprising the regulator for the throttle and links of a steam-engine, showing the circuit connections. Fig. 6 is a side elevation of the device as applied to an engine, and Fig. 7 a front elevation of the same. Fig. 8 is an elevation of the valve-controlling device, cylinder, and connection to control the links or throttle. Fig. 9 is a sectional view of the same.

In Fig. 1, A is a shaft, upon which are secured six commutators $a'$ to $a^6$, having six brushes bearing thereon, $a^7$ to $a^{12}$. The periphery of each commutator is provided with conducting material (indicated by the white portion Y) and with insulating material Z, (indicated in black.) These commutators are so arranged along the shaft A that the insulated portion of the periphery in each is more advanced on the axis of the shaft A than the one immediately preceding it—that is to say, if the insulated portion of the commutator $a'$ is in the horizontal plane of shaft A that of the commutator $a^2$ will be several degrees out of such plane and that of the commutator $a^3$ several degrees farther removed from the same plane in the same direction, and so on. The brushes $a^7$ to $a^{12}$ are of any suitable form. The arrangement of commutators illustrated in Fig. 1 is the arrangement that I use in controlling the throttle of a steam-engine, as will be hereinafter described—that is to say, the position of the insulation of each commutator is arranged an interval in advance of the insulating material of the previous commutator.

In Fig. 2 I have indicated the commutators in the positions they will occupy when employed in connection with the operation of the links of an engine, as will hereinafter be described, and wherein the insulated portions of the commutators $a^3$ and $a^4$ are substantially coincident, being, as shown, in about the same horizontal plane as the shaft. The insulated portions of the commutators $a^5$ and $a^6$ at the right and $a^2$ and $a'$ at the left are arranged at proper distances from each other and from the central commutators, it being noted that the insulated portions of the commutators $a'$ and $a^2$ are practically in line with the insulated portions of the commutators $a^5$ and $a^6$, respectively.

Fig. 3 shows the shaft A journaled in bearings carried by a bracket $a^{14}$, the shaft B being broken away in order that the commutators and brushes may be seen in detail. $a^{13}$ indicates a sprocket-wheel secured to the end of the shaft A.

Fig. 4 is a sectional view of Fig. 3, taken on the line $x\,x$, and shows the commutators in section provided with the conducting material $y$ and insulating material $z$, and also the position of the end brush $a^{12}$ is shown.

In Fig. 5 the shaft B is intended to indicate the shaft controlling the links, and the shaft F to indicate the shaft controlling the throttle. C indicates a cylinder controlling the link-shaft B, and C′ indicates the cylinder controlling the throttle-shaft F. The shafts A and A′ carry the commutators and are geared to the shafts B and F, respectively, by pinions $a^{15}$ and $f'$. D and $D^2$ are electromagnets controlling the inlet and exhaust ports of the cylinder C, and D′ and $D^3$ are electromagnets controlling the ports of the cylinder C′. W is a dynamo or other source of electric power, and G and H are electric switches having contact-plates $g$ and $h$ and contact-points $g'$ to $g^6$ and $h'$ to $h^5$. E and E′ indicate belts operating the pointers of dials $e^2$ to $e^5$ by means of the sprocket-wheels $a^{13}$ and $a^{13}$.

Figs. 6 and 7 illustrate the device as set forth in the operation of a steam-engine for controlling the links and throttle. All of the parts shown in these drawings have been heretofore identified, with the exception of the levers $x^3$ and $x^4$, which are shown as the usual means of operating the throttle and links by hand.

The circuit connections illustrated in the accompanying drawings in Fig. 5 are described as follows:

I will first describe the arrangement as applied to the links of the engine and next as applied to the throttle. The commutators $a'$, $a^2$, and $a^3$ and electromagnet $D^2$ are arranged to be in the circuit I. The commutators $a^4$, $a^5$, and $a^6$ and electromagnet D are arranged to be in the circuit J, the regulation of the circuit connections being controlled by the switch H. The commutators $a'$ to $a^6$ are adjusted upon the shaft A as follows: The insulated portions of the commutators $a^3$ and $a^4$ are arranged to engage the brushes $a^9$ and $a^{10}$ when the link is in a position to stop the engine. The insulated portion of the commutators $a^2$ and $a^5$ is arranged to be an interval in advance of that of $a^3$ and $a^4$, but in different directions, and the insulated portion of the commutators $a'$ and $a^6$ is arranged to be an interval in advance of the insulated portion of the commutators $a^2$ and $a^5$. The commutators, therefore, being in the position above described—i. e., to stop the engine—and the insulated portion of the commutator $a^3$ in contact with its brushes, and it is desired to move the engine a step in one direction, the switch H is brought in contact with the contact-point $h^2$, and the circuit is made through the brushes $a^8$, commutator $a^2$, electromagnet $D^2$, and the circuit completed through the switch H. The electromagnet $D^2$ is thus energized, and, as hereinafter described, pressure is admitted into the cylinder C, thus moving the commutator $a^2$ until its brush comes in engagement with its insulated portion, thus breaking the circuit, thereby deënergizing the magnet $D^2$ and stopping the cylinder C. The commutators being in position last described, and it being desired to move the engine a step farther in the same direction, the switch H is brought in engagement with contact-point $h'$, and the circuit is made through the brush $a^7$, commutator $a'$, and electromagnet $D^2$, and the circuit is completed through the switch H. The electromagnet $D^2$ being thus energized, the pressure is admitted, as hereinafter described, into the cylinder C, thus moving the commutator $a'$ until its insulated portion comes in engagement with its brush $a^7$, when the circuit is broken and movement of the parts is arrested; and when it is desired to stop the engine, the commutators being in position last described, the switch H is brought in engagement with the contact-point $h^3$, and the circuit is made through the brush $a^{10}$, commutator $a^4$, electromagnet D, and the circuit is completed through the switch H. The same operation is performed with the commutators $a^3$, $a^5$, and $a^6$ to move the links in a direction opposite to that last described, $a^3$ being to stop the engine, $a^5$ to move it one step farther, and $a^6$ one step farther than $a^5$.

I will now describe the circuit connections of the throttle-controlling device. The commutators here are arranged on the shaft A'. (See Fig. 5.) The circuit connections through the commutator $a'$ are used when it is desired to shut off the steam from the engine. When the throttle is closed, the insulated portion of the commutator $a'$ is in contact with its brush $a^7$. In this position the insulated portion of the commutator $a^2$ is at a point one space in advance of its brush and the insulated portion of commutator $a^3$ is two spaces in advance of $a'$, and the insulated portions of the commutators $a^4$, $a^5$, and $a^6$ are each one interval in advance of the preceding one. The throttle being closed and the insulated portion of the commutator $a'$ being in engagement with its brush $a^7$, and it being desired to admit a small supply of steam into the engine, the switch G is brought into engagement with contact-point $g^2$ and the circuit is made through the brush $a^8$, commutator $a^2$, electromagnet $D^3$, and the circuit completed through the switch G, thus energizing the electromagnet $D^3$ and admitting pressure into the cylinder C', as hereinafter described, thus slightly opening the throttle and moving the shaft A' until the brush $a^8$ is in engagement with the insulated portion of the commutator $a^2$, when the circuit is broken and valve of cylinder C' closed, the throttle remaining slightly open. The circuits through the other commutators are made by the movement of the switch G, and the amount of pressure admitted into the cylinder C' is dependent on the length of the interval during which the electromagnet $D^3$ is energized, as heretofore recited.

I have illustrated my device as the same may be operated in connection with the valve-controlling devices of a steam-engine, and I have shown the valve-controlling device in Figs. 8 and 9. For a complete description of the same reference is had to my application for United States Letters Patent, filed October 30, 1893, Serial No. 489,506. Hence it will not be necessary for me to describe these devices with particularity. I simply describe them by reference to the magnets D to $D^3$.

The operation of my device is as follows: When I desire to admit steam into the engine, the steam having been previously cut off, and, as heretofore described, adjustment of the commutators for regulating the throttle having been previously arranged so that the insulated portion of the commutator $a'$ is beneath its brush, I move the electric switch G to the contact-point $g^2$. This makes the circuit through the pens $a^8$ and the commutator $a^2$, thence through the electromagnet $D^3$ back to the switch G, thus energizing the electromagnet $D^3$ and causing the same to operate to admit pressure into the cylinder C', which operates to partially rotate the shafts F and A' and carries the commutator $a^2$ around until the insulated portion thereof is beneath its brush, when the circuit is broken and the valve is closed and no more steam admitted into the cylinder, so that the throttle remains stationary. So if we desire to open the throttle a degree farther, I bring the switch G onto the contact-point $g^3$ and the mechanism will operate again in the same manner until the brush $a^9$ is over the insulated portion of the commutator $a^3$, when the mechanism will again stop. It has heretofore been described that the insulated portion of each of these commutators is a step in advance of the previous commutator, so that a regular scale of degrees is created. At all times when it is desired to cut off the steam the lever of switch G will be brought back to the contact-point $g'$ and the throttle will be closed.

It will be seen that I arrange to close the throttle suddenly by one motion. I can do this because there is no danger of injuring the engine by so doing; but in opening the throttle this must be done slowly in order that the machinery may not be strained. I therefore establish these degrees of pressure in opening the throttle in order to avoid this result.

When I desire to move the links backward or forward to start the engine in either direction or to stop the same, the operation is as follows: As heretofore recited, the arrangement of the insulated portion of the commutors on the shaft A is such that when the links are in a position to stop the machinery the insulated portion of the commutators $a^3$ and $a^4$ is in engagement with their brushes. I will suppose, for the sake of illustration, that the commutators $a'$ and $a^2$ are to move the links to cause the engine to move the propeller of a ship astern and the commutator $a^4$ to bring the same to a position where the machinery will stop, and that the commutators $a^5$ and $a^6$ are arranged to operate the machinery so as to go ahead, and the commutator $a^3$ to bring the links to a position where the machinery will stop. This being recognized, and the position of the links being such that when the engine is at rest the insulated portion of the commutators $a^3$ and $a^4$ will be under their brushes, then should it be desired to move the ship astern at a moderate speed the switch H will be brought into engagement with the contact-point $h^2$, when the circuit will be made through the brush $a^8$, the commutator $a^2$ through the electromagnet $D^2$, and the circuit completed to the switch H. The operation here will be substantially the same as that already described. The electromagnet $D^2$ will be energized and will operate to admit pressure into the cylinder C, thus causing the shaft B to revolve, carrying, also, the shaft A and the various commutators thereon until the insulated portion of the commutator $a^2$ will engage its brush $a^8$ and break the circuit, when the mechanism will cease to operate because the electromagnet $D^2$ will be demagnetized and the pressure in the cylinder cease. If it is desired to move the vessel more rapidly astern, the switch H will be moved still farther to the contact-point $h'$ and the same result will occur as heretofore recited; and when it is desired to stop the machinery the switch H will be brought over to the contact-point $h^4$. The reverse of this operation is performed with the commutators $a^5$ and $a^6$ to send the vessel ahead, and with $a^3$ to stop the same.

As a precautionary measure I have provided an index to the operation of my mechanism in order that the working of the same may be shown, both in the engine-room and in the pilot-house, or in any other points that it may be desired to indicate the operation of the links or throttle. The said indexes are illustrated by the characters $e^2$, $e^3$, $e^4$, and $e^5$, and are operated by the sprocket-wheels $a^{13}$ and $a^{13}$ and belts E and E' running over a system of pulleys and sprocket-wheels connected with the indicators $e^2$ to $e^5$. It will be manifest that when the shaft A or A' moves the indicators will be correspondingly actuated and will show that the electrical connection is complete and that the machinery is in working order.

While I have described and illustrated my device as operating in connection with a motor consisting of a steam-engine, I do not confine or limit myself to this form of motor. The device may be used convertibly with any motor controlled by valves or by electrical connections. When an electric motor is employed, of course, the controlling devices with which my apparatus is connected operate electric connections in the usual form to control the motor.

What I claim is—

1. The combination with a motor controlled electrically, of a series of commutators in the electrical connection to make and break the circuit at predetermined intervals operated by the motor, and means to control the circuit to any one of said commutators, substantially as described.

2. The combination with a motor controlled electrically, of a series of commutators in the electrical connection mounted upon a shaft and operated by the motor, arranged to make and break the circuit at predetermined intervals, and means to control the circuit to any of said commutators, substantially as described.

3. The combination with the links or throttle of a steam-engine, of means to operate the same controlled electrically, and a series of commutators in the electrical connection operated with the links or throttle and arranged to break the circuit at predetermined intervals, and means to control the circuit to any of said commutators, substantially as described.

4. The combination with the links or throttle of a steam-engine, of means to operate the same controlled electrically, and a series of commutators in the circuit connection mounted on a shaft and geared to operate with the links or throttle and arranged to break the circuit at predetermined intervals, and means to control the circuit to any of said commutators, substantially as described.

5. The combination with the links or throttle of a steam-engine, of means to operate the same controlled electrically, and a series of commutators in the electrical connection mounted on a shaft and geared to operate with the links or throttle and provided on their periphery with insulating and conducting material arranged to make and break the circuit at predetermined intervals, and means to control the circuit to any of said commutators, substantially as described.

6. In an engine-controlling device, the combination with the links or throttle of a motor to control the same having operative valves controlled by two electromagnets, having their respective armatures secured to the respective valves and separate circuit connections to each of said magnets, in each of said circuit connections a series of circuit-breakers, and means to control the circuit to any one of said circuit-breakers, and means to operate the circuit-breakers in conjunction with the motor, said circuit-breakers being arranged to make and break the circuit at predetermined intervals, substantially as described.

This specification signed and witnessed this 25th day of October, 1893.

CHARLES E. ONGLEY.

Witnesses:
V. BLOOM,
GEO. J. SCHOEFFEL.